(12) United States Patent
Hassounah et al.

(10) Patent No.: US 11,125,259 B2
(45) Date of Patent: Sep. 21, 2021

(54) AUTOMATED SELF-ALIGNING MECHANICAL FASTENER

(71) Applicant: Ample Inc., San Francisco, CA (US)

(72) Inventors: Khaled Hassounah, San Francisco, CA (US); Ankit Srivastava, San Francisco, CA (US)

(73) Assignee: Ample, Inc., San Francisco, CA (US)

( * ) Notice: Subject to any disclaimer, the term of this patent is extended or adjusted under 35 U.S.C. 154(b) by 131 days.

(21) Appl. No.: 16/389,496

(22) Filed: Apr. 19, 2019

(65) Prior Publication Data

US 2019/0242416 A1 Aug. 8, 2019

Related U.S. Application Data

(62) Division of application No. 15/185,973, filed on Jun. 17, 2016, now Pat. No. 10,359,066.

(60) Provisional application No. 62/180,680, filed on Jun. 17, 2015.

(51) Int. Cl.
  *B23P 19/00* (2006.01)
  *F16B 5/02* (2006.01)
  *B23P 19/10* (2006.01)
(52) U.S. Cl.
  CPC .............. *F16B 5/025* (2013.01); *B23P 19/10* (2013.01)

(58) Field of Classification Search
  CPC .. B23P 19/06; B23P 19/10; F16B 5/02; F16B 5/025
  See application file for complete search history.

(56) References Cited

U.S. PATENT DOCUMENTS

| | | | |
|---|---|---|---|
| 3,695,139 A | 10/1972 | Howe | |
| 5,152,582 A | 10/1992 | Magnuson | |
| 6,688,825 B1 | 2/2004 | Stewart et al. | |
| 2004/0227038 A1 | 11/2004 | Strasser | |
| 2005/0183272 A1* | 8/2005 | Meadows | F41G 1/467 33/265 |
| 2010/0132168 A1 | 6/2010 | Coffland et al. | |
| 2010/0275549 A1 | 11/2010 | Bruce et al. | |
| 2011/0188962 A1* | 8/2011 | Joyce | F16B 21/18 411/353 |

* cited by examiner

*Primary Examiner* — Paul D Kim
(74) *Attorney, Agent, or Firm* — Intrinsic Law Corp.

(57) ABSTRACT

Corresponding threaded mechanical fasteners are automatically aligned with an alignment guide. The alignment guide includes a tapered cavity defined in a housing. As the threaded mechanical fasteners are moved towards one another to mate, the tapered cavity in the alignment guide causes the threaded mechanical fasteners to align with each other. The mechanical fasteners can connect a modular rechargeable battery to a battery receptacle in a vehicle.

10 Claims, 14 Drawing Sheets

AUTOMATED SELF-ALIGNING MECHANICAL FASTENER

RELATED APPLICATIONS

This application is a divisional of and claims priority to U.S. application Ser. No. 15/185,973, now U.S. Pat. No. 10,359,066, entitled "Automated Self-Aligning Mechanical Fastener", filed Jun. 17, 2016, which claims priority to U.S. Provisional Application Ser. No. 62/180,680 entitled "Self-Aligning Mechanical Fastener," filed on Jun. 17, 2015, all of which are hereby incorporated by reference.

TECHNICAL FIELD

The present disclosure generally relates to mechanical fasteners for mating physical components of an apparatus.

BACKGROUND

Physical components often need to be mated or joined together to form an apparatus. Such components can be mated or joined together with an adhesive (e.g., glue), a clamp, a nail, a screw, a bolt, or a similar device. Screws and bolts include a head and a threaded shaft that is driven into one or more physical components to mechanically secure the components together. A driving apparatus (screwdriver, wrench, Allen wrench, or similar device) drives the head, which causes the threaded shaft to rotate. A bolt or nut can be attached to a proximal end of the threaded shaft, which can be rotatably tightened to generate a mechanical force between the head and the bolt/nut to secure one or more parts therebetween.

In order to drive the head, accurate mechanical alignment is required between the driving apparatus and the head. For example, a screw head or bolt head includes a recessed portion to receive a corresponding end of a flathead or Phillips screwdriver. Bolt heads can also have a raised or recessed hexagonal shape that allows the bolts to be engaged by a wrench. In addition, accurate mechanical alignment is required between the threaded shaft and a bolt or nut to drive the threaded shaft into the bolt/nut.

Although such mechanical alignment can be done manually by a human with relative ease, challenges arise in automated systems. For example, robotic systems need expensive and complex optical devices for guidance and alignment. In addition, robotic systems need to manipulate and keep track of multiple loose/detached components (e.g., screws, bolts, etc.).

The present disclosure provides improved and lower-cost alignment systems for mechanical fasteners.

SUMMARY

The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Other objects, advantages and novel features of the disclosure will be set forth in the following detailed description of the disclosure when considered in conjunction with the drawings.

In an aspect, the invention is directed to a self-aligning mechanical fastener system. The system includes a first apparatus comprising a first threaded fastener disposed at least partially in a first fastener guide hole defined in a first fastener guide housing; and a motor in mechanical communication with said first fastener component. The system also includes a second apparatus comprising a second threaded fastener disposed at least partially in a second fastener hole defined in a second fastener housing, the second fastener configured to mate with the first threaded fastener; a second fastener alignment guide disposed on the second fastener housing, the second fastener alignment guide including a hollow body having a hollow body aperture defined by an internal tapered wall, the hollow body aperture having a first width at a first end of the hollow body and a second width at a second end of the hollow body, the first width greater than the second width, the second width configured to align the first threaded fastener with the second threaded fastener when the first fastener guide housing is disposed in the hollow body aperture of the hollow body aperture of the second fastener alignment guide; and a plate connecting the second end of the second fastener alignment guide to the second fastener guide housing, the plate having a plate hole in alignment with the hollow body aperture and the second fastener hole, the plate hole having a plate hole width less than a width of at least a portion of the second threaded fastener disposed in the second fastener hole, wherein the plate secures at least a portion of the second threaded fastener in the second fastener hole.

In another aspect, the invention is directed to an apparatus comprising: a housing including a housing hole defined in a housing face of the housing; a threaded fastener including at least a portion of the fastener disposed in the hole, the at least a portion of the fastener having a fastener width; a plate disposed on the housing face, the plate having a plate hole aligned with the housing hole, the plate hole having a width less than the fastener width, wherein the plate retains the at least a portion of the fastener in the housing hole; and an alignment guide including a body having opposing first and second faces, the first face disposed on the plate, the body having a cavity extending from the first face to the second face, the cavity having a first width at the first face and a second width at the second face, the second width greater than the first width, the cavity aligned with the plate hole and the housing hole.

In another aspect, the invention is directed to a method comprising: with a robot, raising a portable apparatus towards a stationary apparatus, the portable apparatus including an alignment guide including a body having opposing first and second faces, the body having a cavity extending from the first face to the second face, the cavity having a first width at the first face and a second width at the second face, the second width greater than the first width; inserting the stationary apparatus into the cavity on the second face of the portable apparatus; aligning a first threaded fastener at least partially disposed in a first housing of the stationary apparatus with a corresponding second threaded fastener at least partially disposed in a second housing of the portable apparatus, the second housing disposed on the second face of the alignment guide, the first threaded fastener aligned with the cavity in the alignment guide; and rotating the first threaded fastener to engage and secure the first threaded fastener with the corresponding second threaded fastener.

This overview is intended to provide an overview of subject matter of the present patent application. It is not intended to provide an exclusive or exhaustive explanation of the invention. Further limitations and disadvantages of conventional and traditional approaches will become apparent to one of skill in the art, through comparison of such systems with some aspects of the present invention as set forth in the remainder of the present application with reference to the drawings.

BRIEF DESCRIPTION OF THE DRAWINGS

For a fuller understanding of the nature and advantages of the present invention, reference is made to the following detailed description of preferred embodiments and in connection with the accompanying drawings, in which.

DETAILED DESCRIPTION

Figure 1:
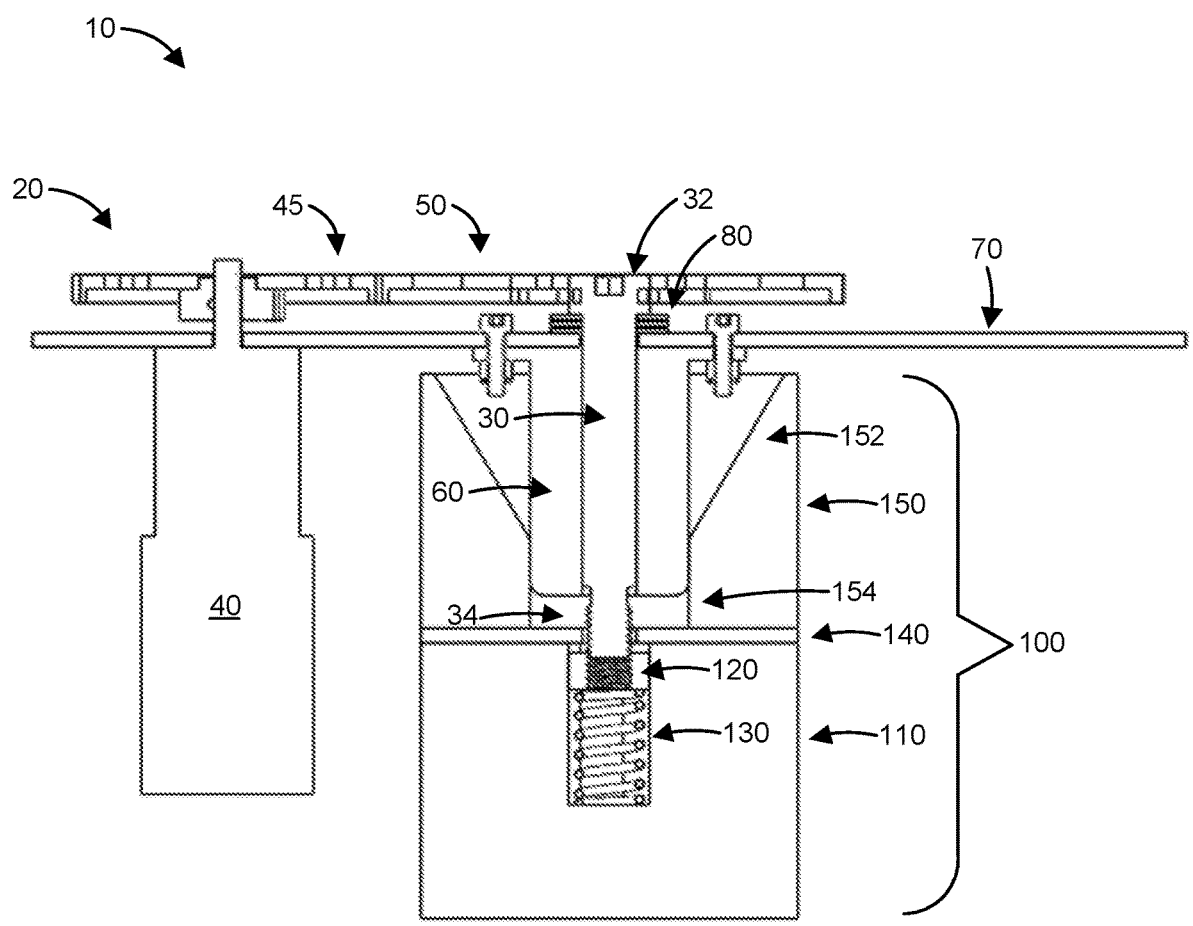
FIG. 1 illustrates a cross section of an exemplary automated system that includes a mechanical fastener.

FIG. 1 illustrates a cross section of an exemplary automated system 10 that includes a mechanical fastener. The system includes a robotic system 20 for driving a bolt 30. The robotic system 20 includes an actuating mechanism 40 (e.g., a motor) having an actuator gear 45 that mechanically communicates with a bolt gear 50. In some embodiments, a chain connects actuator gear 45 and bolt gear 50. Alternatively, actuator gear 45 and bolt gear 50 interleave each other. The bolt gear 50 is mechanically coupled to a head 32 of the bolt 30 to provide torque thereto. A shaft 35 of the bolt 30 is disposed in a channel 65 defined in bolt guide 60. The bolt guide 60 is attached to a support plate 70, which can be connected to a larger system (e.g., an electric vehicle). A threaded portion 34 of the bolt shaft extends beyond the bolt guide 60 to engage nut 120. A thrust bearing 80 can be disposed between the head 32 of the bolt 30 and the support plate 70 to reduce friction therebetween. Additional sliding mechanical interfaces, including lubricated or polished metal surfaces, ceramics, polymers, or bearings can facilitate the smooth movement of contacting parts against each other in any of the present embodiments as would suit a particular application. Therefore, the particular configurations of the shown illustrative examples are not intended to be limiting, and those skilled in the art will appreciate equivalent or alternate embodiments and arrangements consistent with the present disclosure, which are also comprehended by the present disclosure and claims.

The bolt 30 and nut 120 provide a mechanical connection between (a) bolt guide 60 and support plate 70 (and anything connected to support plate 70) and (b) removable apparatus 100. The removable apparatus 100 includes a body 110 having a channel 115 defined therein to hold nut 120, which is disposed on a spring 130. The channel 115 can be square, hexagonal, or a similar shape (e.g., an angular shape) in a second cross section orthogonal to the plane defining the side view illustrated in FIG. 1. The shape and size of channel 115 are configured to prevent the nut 120 from rotating when it is engaged by the bolt 30.

A plate 140 is disposed on the body 110. The plate 140 can be connected to a larger system, such as a tray that holds multiple modular replaceable electric batteries as described below. The plate 140 includes a hole 145 disposed over the channel 115. The hole 145 has a smaller diameter than the channel 115 to retain the nut 120 in the channel 115. A hollow tapered guide 150 is disposed on the plate 140. The tapered guide 150 includes a tapered portion 152 and a channel portion 154. The tapered portion 152 tapers from a wide diameter to the narrower diameter of the channel portion 154. The width of the channel portion 154 is configured to secure the bolt guide 60 so that the threaded portion 34 of bolt 30 is aligned with the nut 120 through hole 145 and channel 115. In some embodiments, the width of the channel portion 154 is about 0.25" to about 0.5" larger than the width of the bolt guide 60.

In operation, the removable apparatus 100 is moved (e.g., by a second robotic system) below the automated system 10 for connection thereto. The removable apparatus 100 is positioned so that the nut 120 is in approximate alignment with the bolt 30 (e.g., as illustrated in FIG. 1). The removable apparatus 100 and the automated system 10 are brought closer to one another so that the bolt 30 and nut 120 are in contact with one another. In some embodiments, the removable apparatus 100 is moved towards (e.g., raised, positioned from the side, etc.) the automated system 10 (i.e., towards bolt guide 60). In addition, or in the alternative, the automated system 10 including bolt guide 60 can be moved towards (e.g., lowered, positioned from the side, etc.) the removable apparatus 100.

If the alignment of the nut 120 and the bolt 30 is offset, the bolt guide 60 touches a sidewall of the tapered portion 152 of the tapered guide 150 as the removable apparatus is raised. The tapered portion 152 causes the bolt guide 60 to align with and pass through the channel portion 154 resulting in alignment of the bolt 30 and nut 120.

When the bolt 30 contacts the nut 120, the spring 130 provides a force to press the nut 120 against the bolt 30 to cause the nut 120 to engage with the bolt 30 as the actuator 40 turns the bolt 30. The threaded portion 34 is driven into the bolt 30 by the actuator 40 until the bolt guide 60 contacts the plate 140 and a minimum torque level is achieved, resulting in a secure mechanical connection between the removable apparatus 100 and the automated system 10. The actuator 40 can include a sensor to measure the torque applied to the bolt 30. When the minimum or predetermined torque level is reached, a feedback circuit can cause the actuator 40 to stop driving the bolt 30. The minimum/predetermined torque level can be adjusted manually (e.g., by user input from an operator) or automatically (e.g., based on the type of removable apparatus 100, bolt 30, nut 120, etc.).

Although the automated system 10 has been described as stationary and the removable apparatus 100 is described as moveable, it is recognized that the converse can also apply. In other words, the automated system 10 can be moveable and the removable apparatus 100 can be stationary. Alternatively, both the removable apparatus 100 and the automated system 10 can be moveable.

In some embodiments, the automated system 10 is disposed in an electric vehicle (e.g., in the bottom of the vehicle). The removable apparatus 100 can include one or more rechargeable batteries (e.g., in the body 110 and/or connected to plate 140) to power the electric vehicle. In some embodiments, the body 110 includes or holds one or more modular rechargeable batteries. In some embodiments, the plate 140 is connected to or secures one or more modular rechargeable batteries. When the battery/modular battery is mechanically connected to the automated system (on the vehicle), an electrical connection between the battery and the vehicle can also be formed. The batteries can be part of a removable tray that includes additional components for the vehicle. The batteries can be electrically connected to one another in the tray and the tray can include one or more electrical outputs for electrically connecting the tray to the vehicle.

As an alternative to recharging the battery of the electric vehicle (e.g., in a rapid charging station or a traditional charging station), the battery (or modular batteries) can be replaced with a fully charged battery, or batteries, (e.g., the removable apparatus 100). The battery replacement can be completely automated using modular robots to remove the old batteries from the car and move the new batteries to approximate alignment with the automated system 10, as described above. An example of a robotic system to replace or recharge batteries (or battery modules) in a vehicle is disclosed in U.S. Provisional Application No. 62/180,686, entitled "Robot Assisted Modular Battery Interchanging System," filed on Jun. 17, 2015, and its related applications, which are hereby incorporated by reference.

Figure 2:
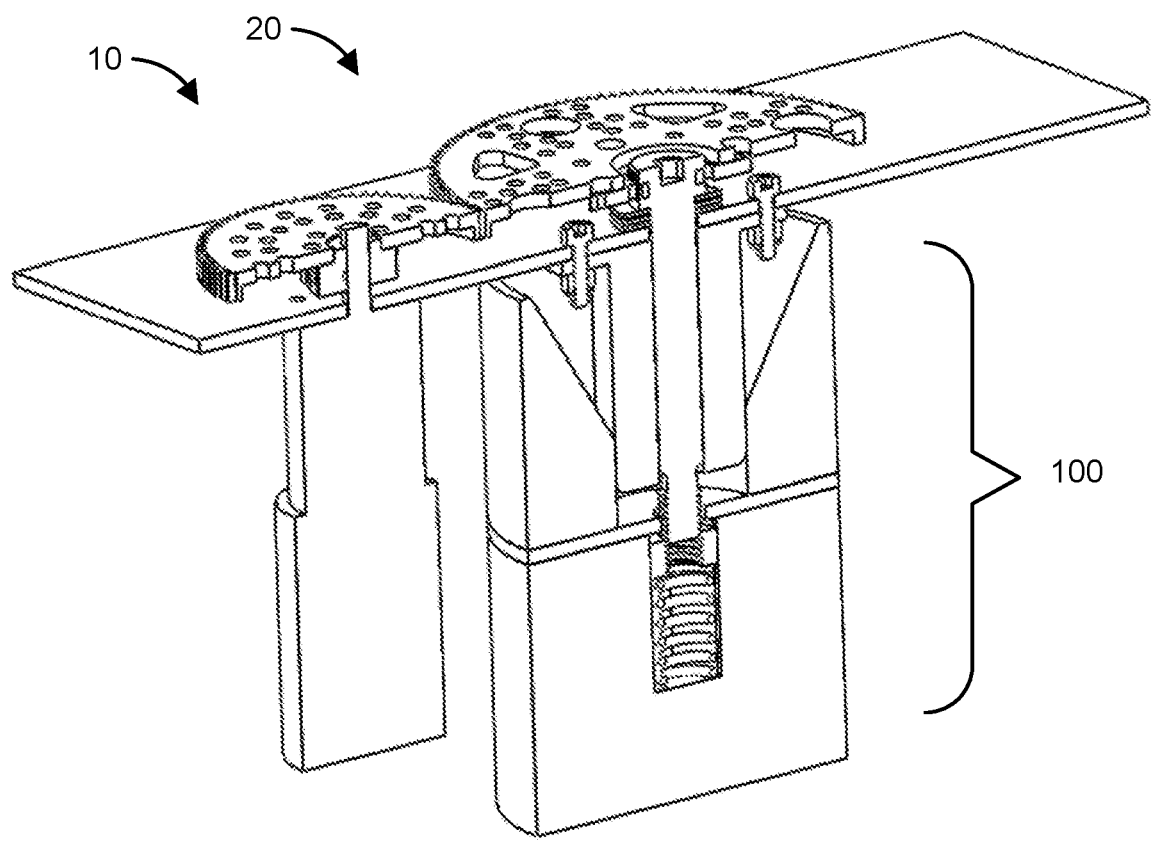
FIG. 2 illustrates a perspective view of a cross section of the automated system of FIG. 1.

FIG. 2 illustrates a perspective view of a cross section of the automated system 10 described above. In FIG. 2, additional details of the actuator gear 45 and bolt gear 50 are illustrated. The actuator gear 45 is driven by actuating mechanism 40 (e.g., a motor). The actuator gear 45 drives bolt gear 50, which in turn drives bolt 30 into nut 120.

Although the above system has been described with respect to a bolt being driven by a robotic system into a nut disposed in a removable apparatus, it is recognized that the system can have the opposite configuration. That is, a nut can be driven by the robotic system into a bolt disposed in a removable apparatus.

Figure 3:
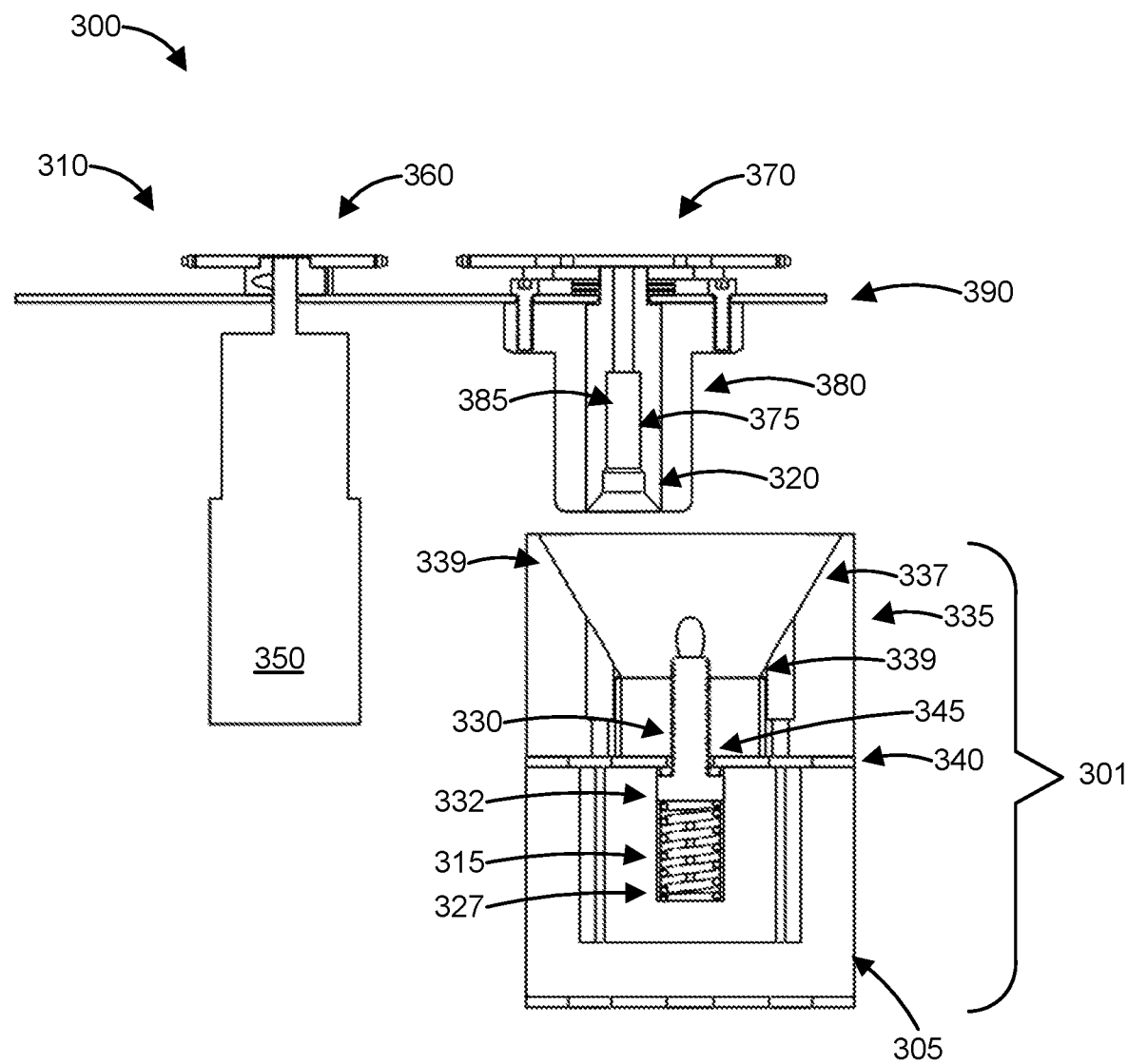
FIG. 3 illustrates a side view of an exemplary automated system having an alternative configuration.

FIG. 3 illustrates a side view of an exemplary automated system 300 having an alternative configuration. The system 300 includes a robotic system 310 for driving a nut 320 into a bolt 330 disposed in removable apparatus 301. The nut 320 is disposed in a channel 385 defined in nut guide 380. Nut guide 380 is attached to a support plate 390, which can be connected to a larger system (e.g., an electric vehicle) in some embodiments.

The robotic system 310 includes an actuating mechanism 350 (e.g., a motor) having an actuator gear 360 that mechanically communicates with a bolt gear 370. The bolt gear 370 is mechanically coupled to nut 320 via shaft 375. The actuating mechanism 350 drives actuator gear 360, which drives bolt gear 370, which in turn drives shaft 375 and nut 320.

Removable apparatus 301 includes a body 305 having a channel 315 defined therein to hold bolt 330, which is disposed on a spring 327. The channel 315 can be square, hexagonal, or a similar shape (e.g., an angular shape) in a second cross section orthogonal to the plane defining the side view illustrated in FIG. 3. The shape and size of channel 315 are configured to prevent the bolt 330 from rotating when it is engaged by the nut 320.

A plate 340 is disposed on the body 305. The plate 340 can be connected to a larger system, such as a tray that holds multiple modular replaceable electric batteries as described below. The plate 340 includes a hole 345 disposed over the channel 315. The hole 345 has a smaller diameter than the channel 315 to retain the head 332 in the channel 315. A tapered bolt guide 335 is disposed on the plate 340. The tapered bolt guide 335 includes a hollow tapered region 337 to receive the nut guide 380. The tapered portion 337 tapers from a wide diameter to a narrow diameter at base 339. The width of the base 339 is configured to secure the nut guide 380 so that the bolt 330 is aligned with the nut 320. In some embodiments, the width of base 339 is about 0.25" to about 0.5" larger than the width of nut guide 380.

In operation, the removable apparatus 301 is moved (e.g., by a second robotic system) below the automated system 300 for connection thereto. The removable apparatus 301 is positioned so that the bolt 330 is in approximate alignment with the nut 320 (e.g., as illustrated in FIG. 3). The removable apparatus 301 and the automated system 300 are then brought closer to one another so that the bolt 330 and nut 320 are in contact with one another. In some embodiments, the removable apparatus 301 is moved towards (e.g., raised, positioned from the side, etc.) the automated system 300 (i.e., towards nut guide 380). In addition, or in the alternative, the automated system 300 including nut guide 380 can be moved towards (e.g., lowered, positioned from the side, etc.) the removable apparatus 301.

Figure 4:
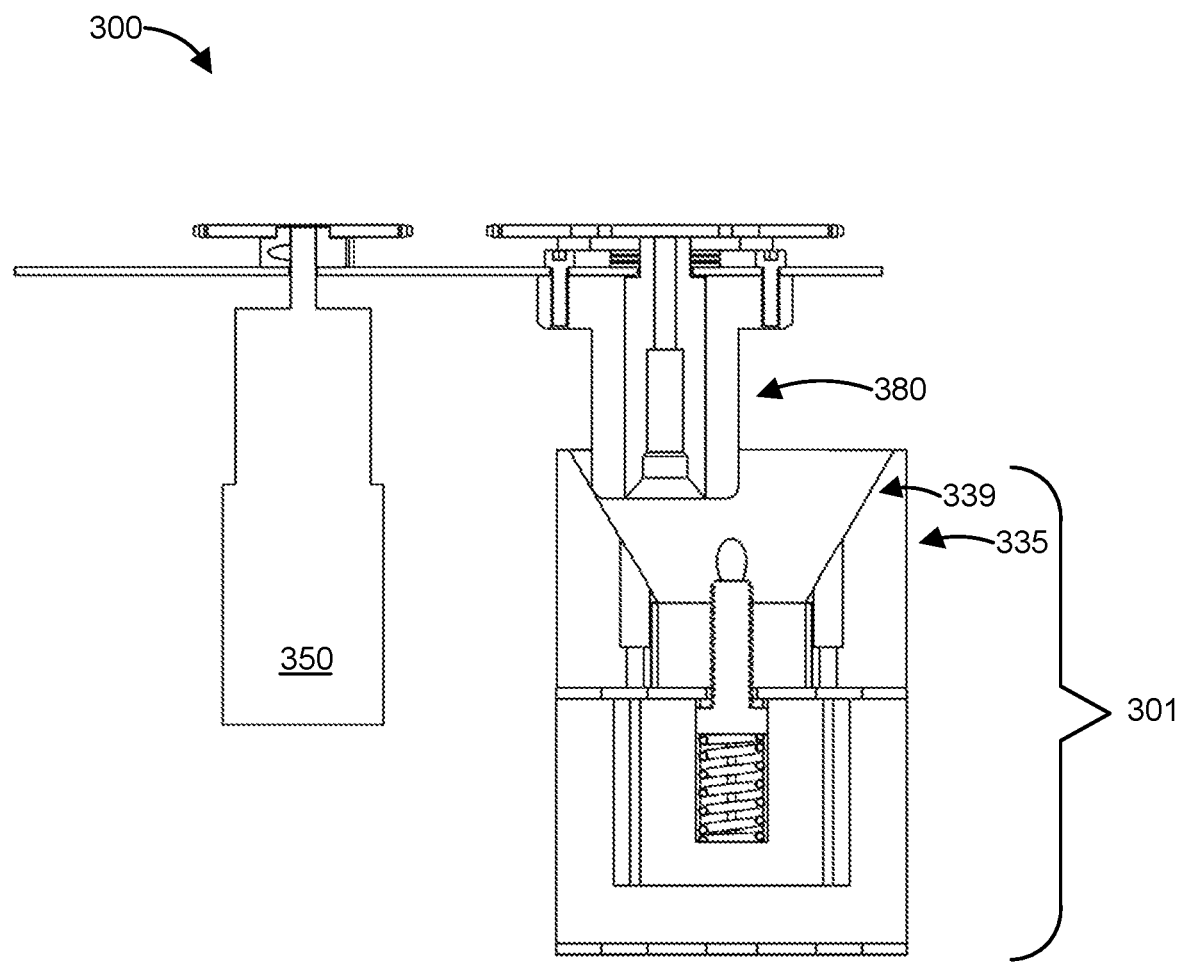
FIG. 4 illustrates the automated system of FIG. 3 during a first stage of alignment.

FIG. 4 illustrates the automated system of FIG. 3 during a first stage of alignment. If the alignment of the nut guide 380 and bolt guide 335 is offset, the nut guide 380 contacts an outwardly-tapered sidewall 339 of the tapered guide 335 on removable apparatus 301 as the removable apparatus 301 is raised towards the automated system 300 (i.e., towards nut guide 380).

Figure 5:
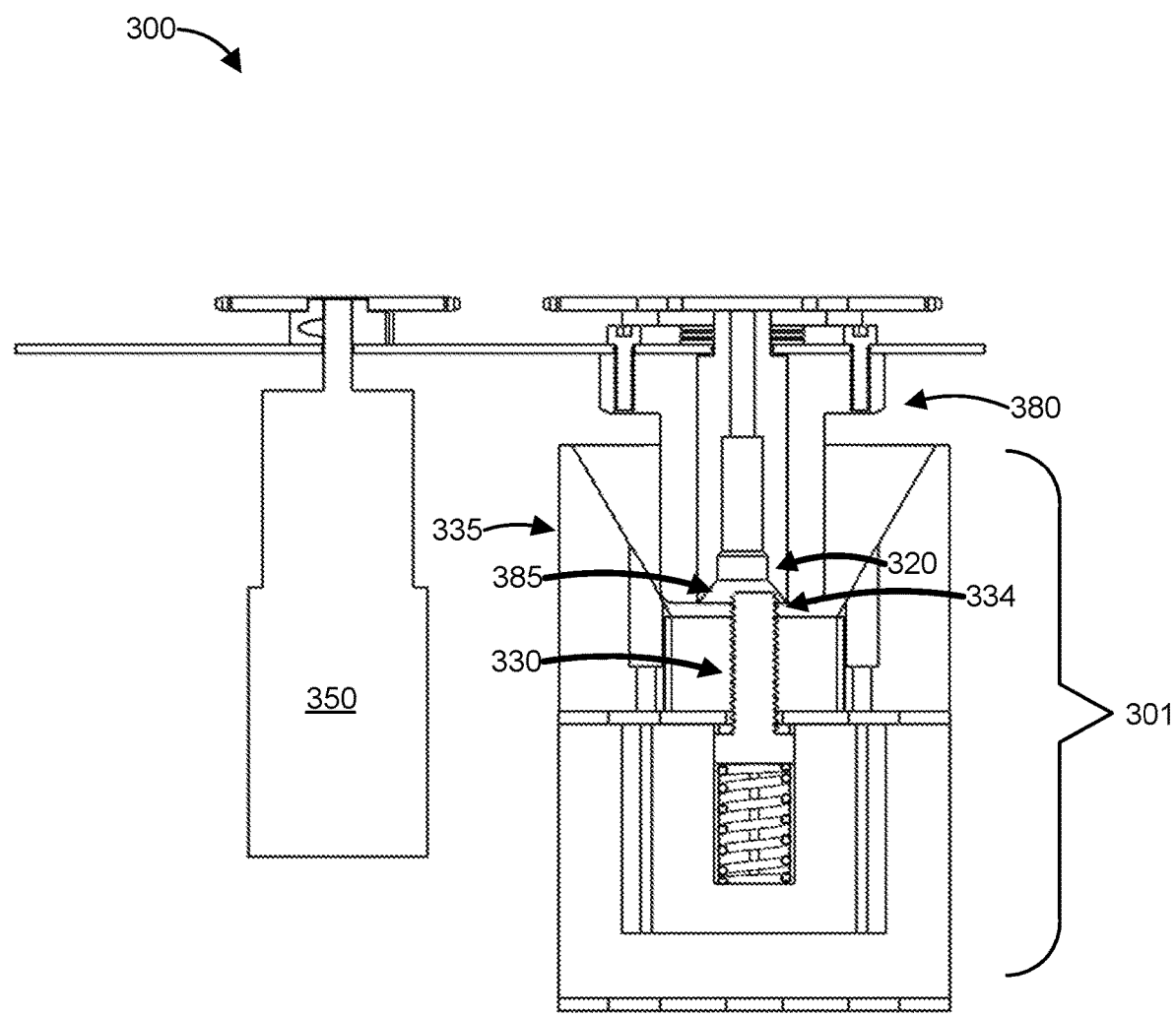
FIG. 5 illustrates the automated system of FIG. 3 during a second stage of alignment.

FIG. 5 illustrates the automated system of FIG. 3 during a second stage of alignment. As illustrated in FIG. 5, the tapered sidewall 339 causes the bolt guide 335 to align with the nut guide 380 as the bolt guide 335 (and removable apparatus 301) is raised towards the nut guide 380. Nut guide 380 includes an outwardly-flared hollow portion 385 that extends from nut 320 to the bottom face of nut guide 380. The hollow portion 385 is configured to receive the tip 334 of the bolt 330 to align nut 320 and bolt 330.

Figure 6:
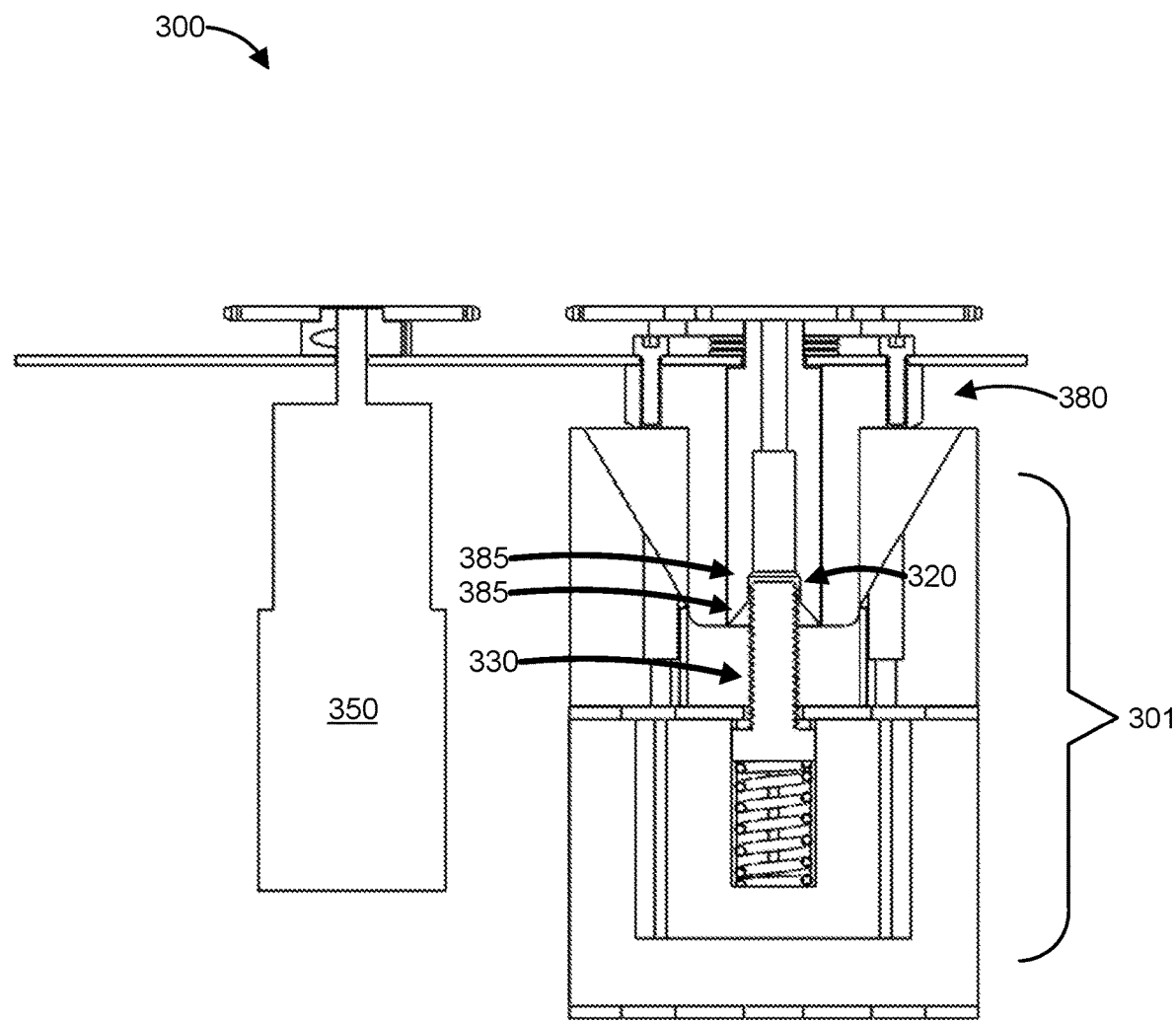
FIG. 6 illustrates the automated system of FIG. 3 during a third stage of alignment.

FIG. 6 illustrates the automated system of FIG. 3 during a third stage of alignment. As illustrated in FIG. 6, after the tip 334 of bolt 330 passes through hollow portion 385 of nut guide 380, the nut 320 and bolt 330 are aligned. The hollow portion 385 can also prevent that the complementary threads of nut 320 and bolt 330 are aligned and not cross-threaded. The hollow portion 385 can be about 0.2 inches to about 0.4 inches in length, about 0.25 inches to about 0.35 inches in length, about 0.3 inches in length, or any length or range between any two of the foregoing values. As used herein, "about" means plus or minus 10% of the relevant value.

In some embodiments, the nut 320 and bolt 330 can include complementary chamfered portions proximal to the respective threads on nut 320 and bolt 330. For example, nut 330 can include a male chamfered portion and bolt 330 can include a female chamfered portion. Alternatively, nut 320 can include a female chamfered portion and bolt 330 can include a male chamfered portion.

Figure 7:
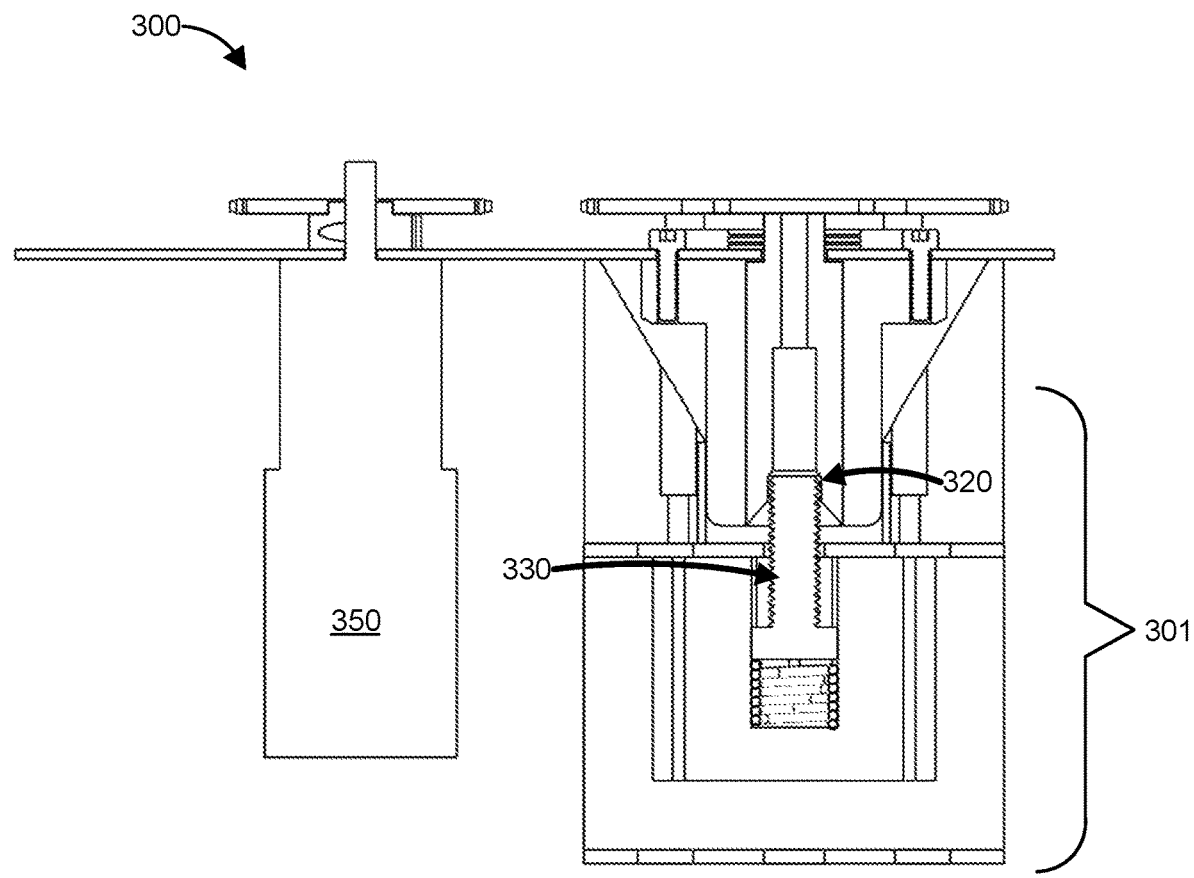
FIG. 7 illustrates the automated system of FIG. 3 in a fully-aligned state.

FIG. 7 illustrates the automated system of FIG. 3 in a fully-aligned state. As illustrated, the nut 320 and bolt 330 are fully aligned and engaged.

Figure 8:
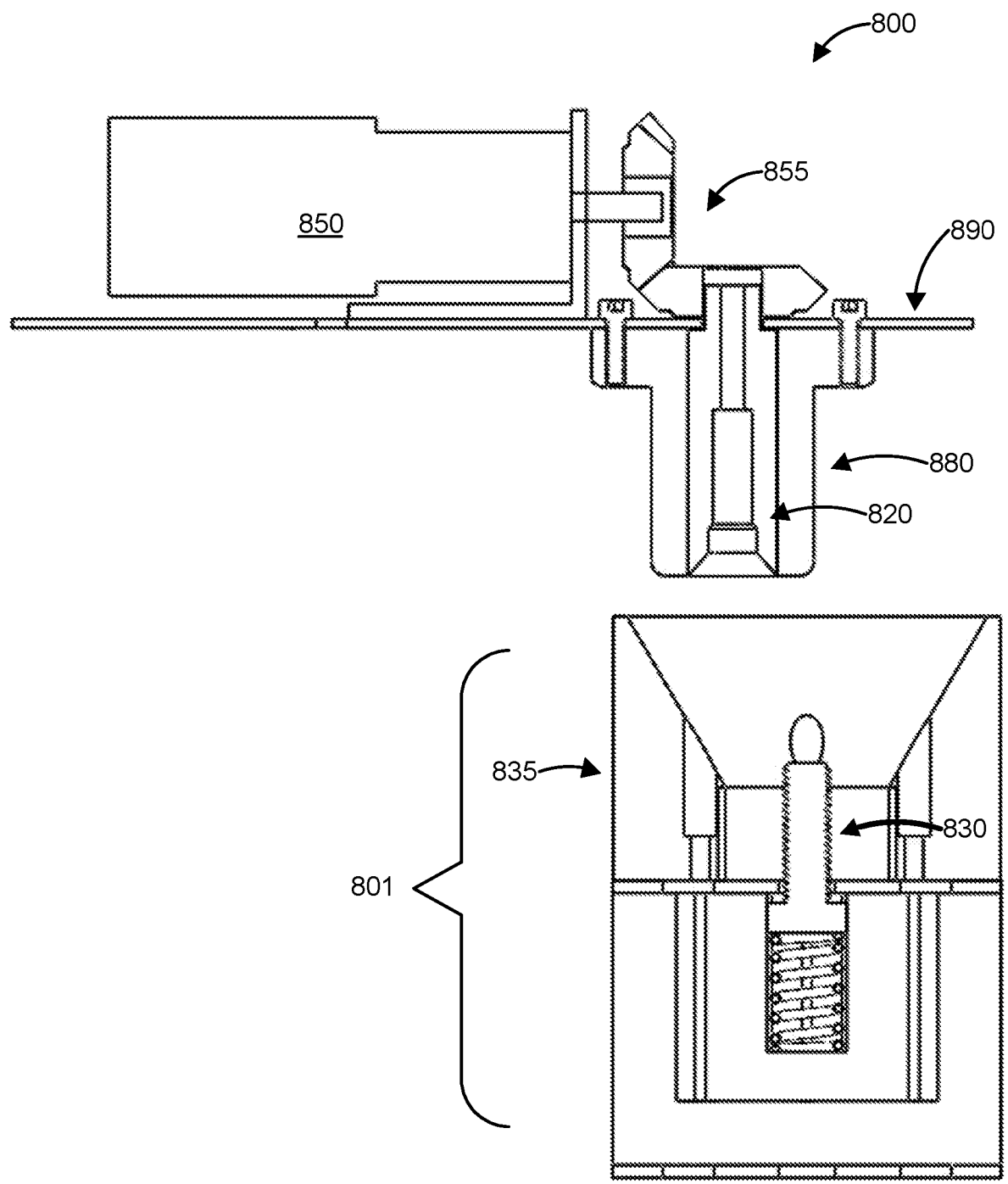
FIG. 8 illustrates an automated system having an alternative configuration.
Figure 9:
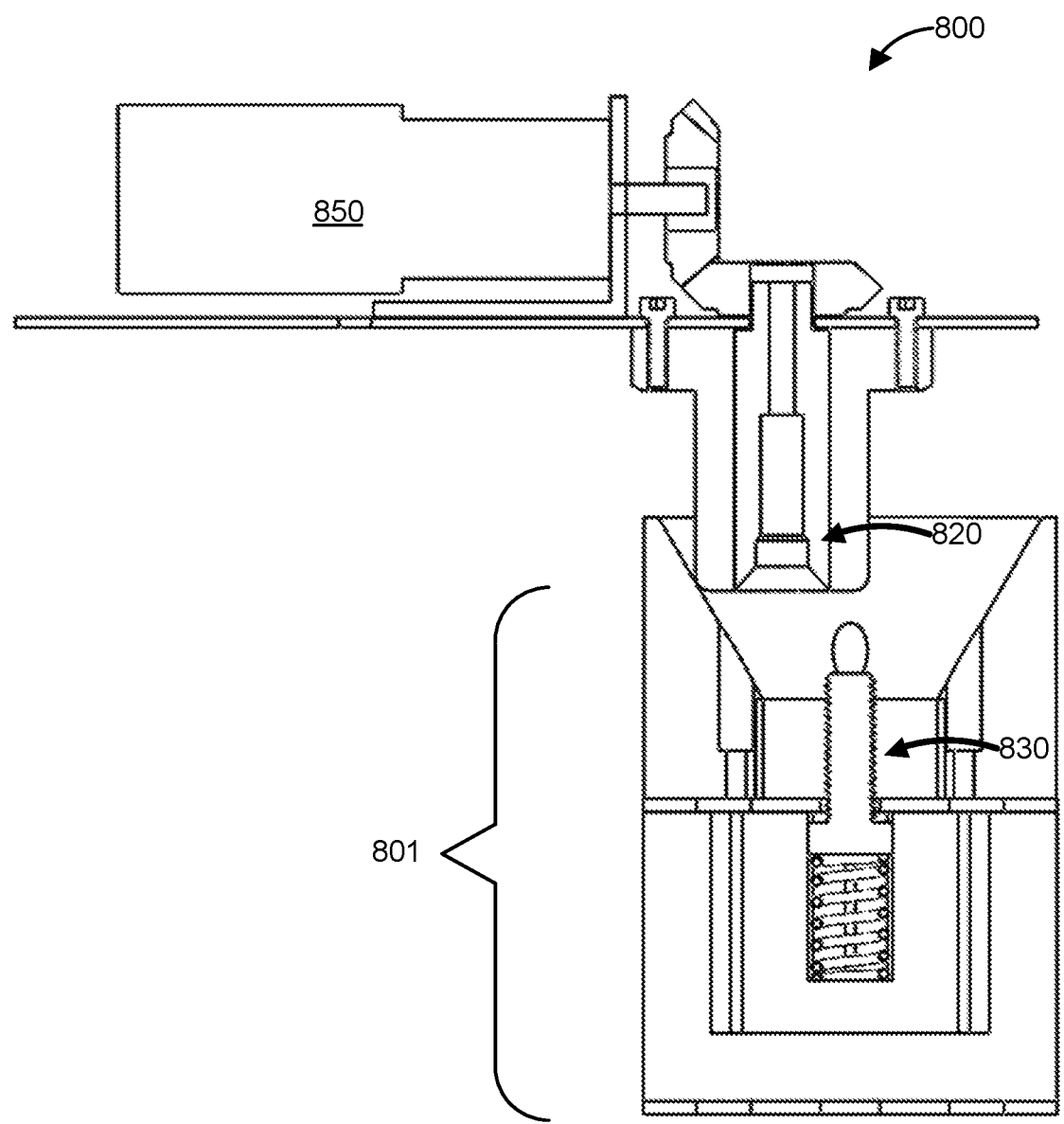
FIG. 9 illustrates the automated system of FIG. 8 during a first stage of alignment.
Figure 10:
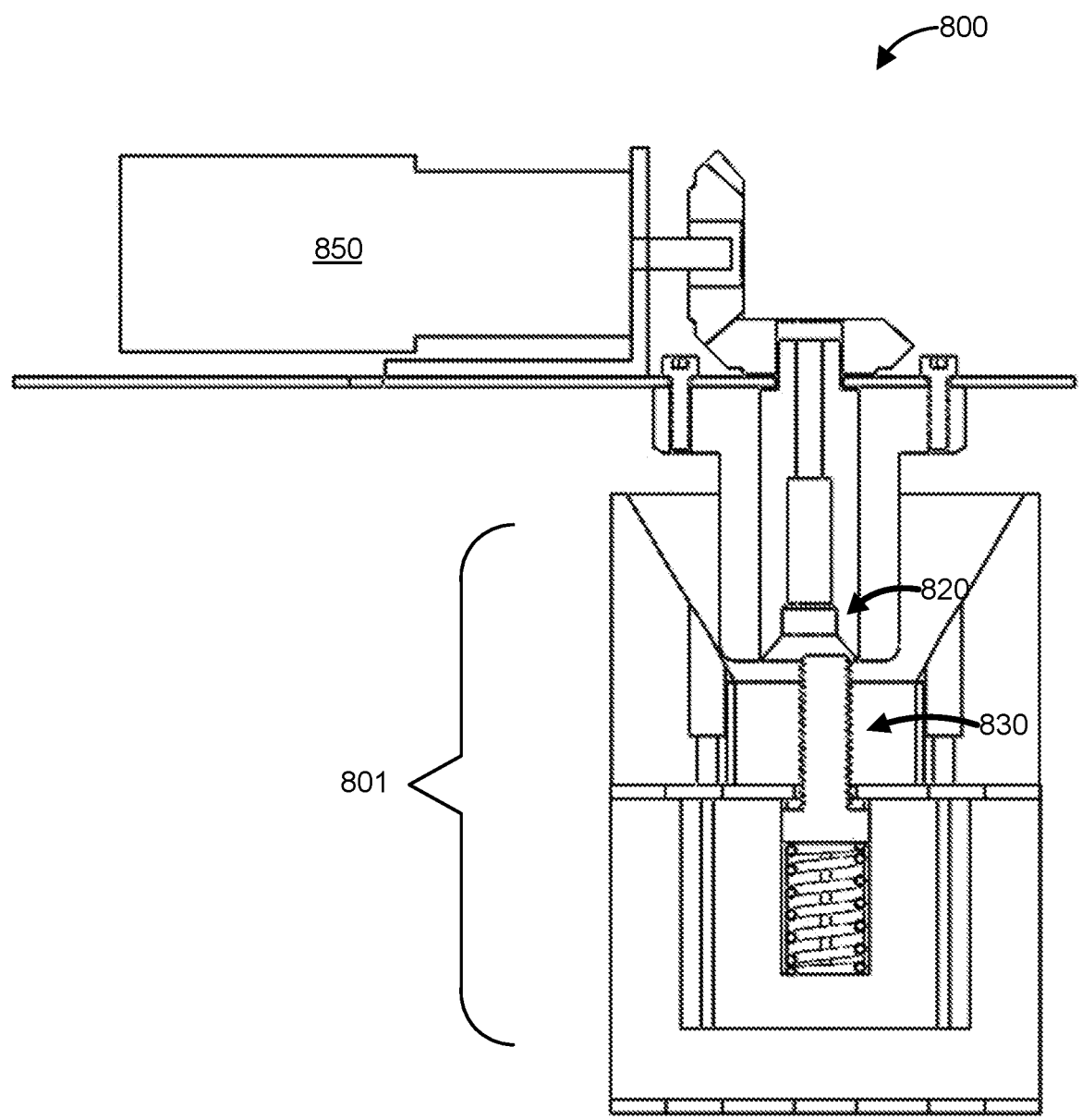
FIG. 10 illustrates the automated system of FIG. 8 during a second stage of alignment.
Figure 11:
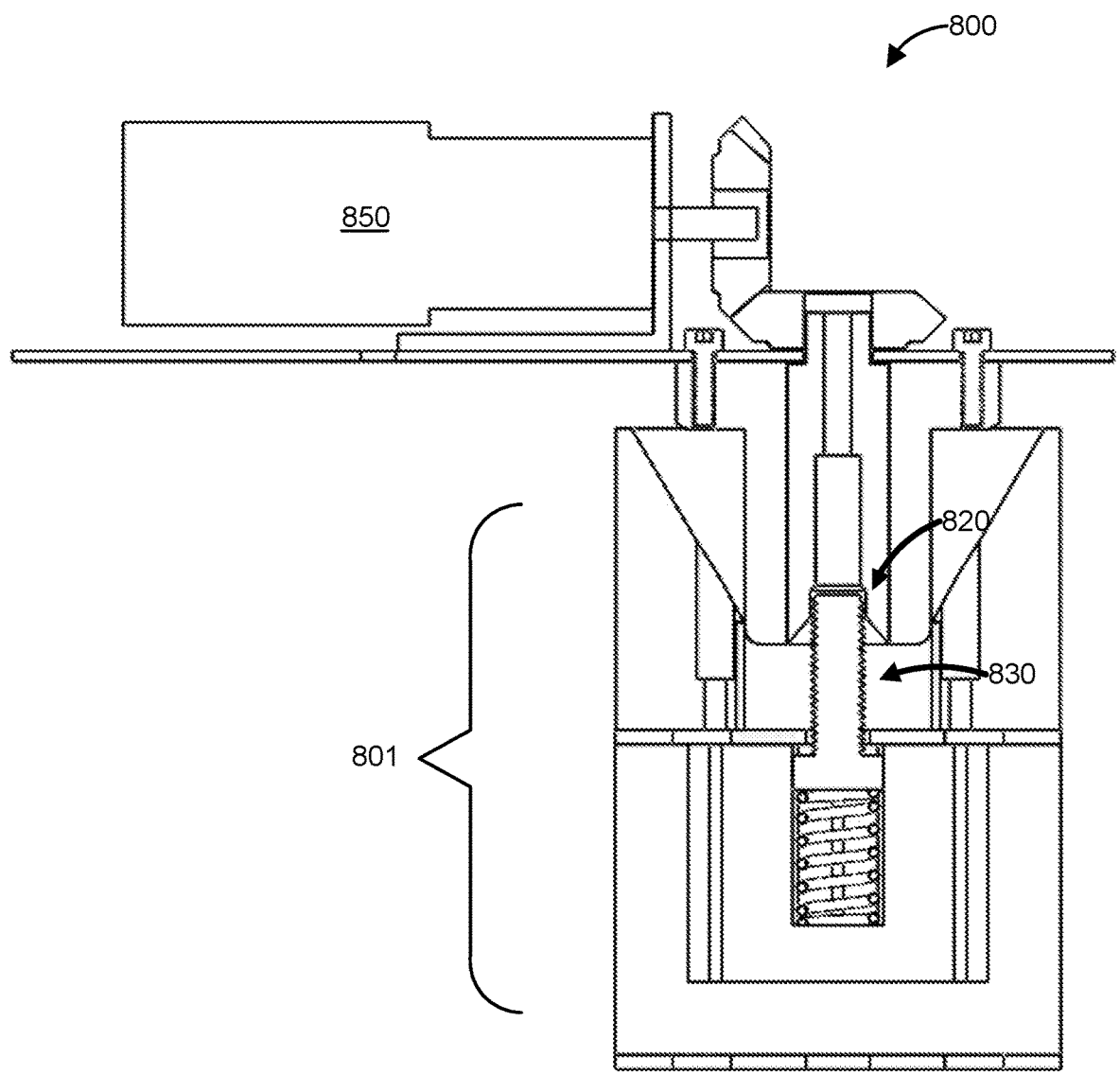
FIG. 11 illustrates the automated system of FIG. 8 during a third stage of alignment.
Figure 12:
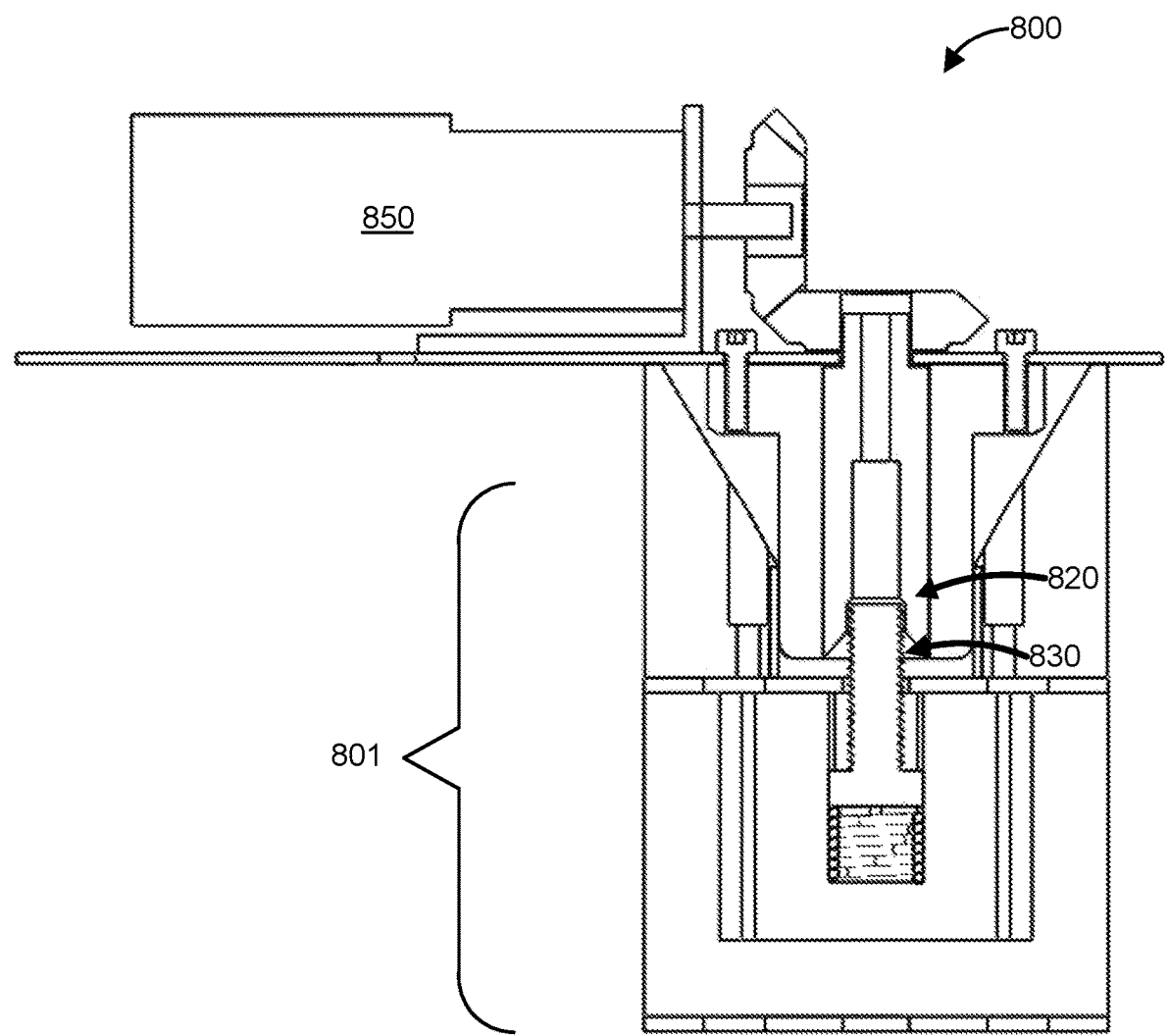
FIG. 12 illustrates the automated system of FIG. 8 in a fully-aligned state.

FIG. 8 illustrates an automated system 800 having an alternative configuration. As illustrated, the automated system 800 includes an actuating mechanism 850 (e.g., a motor) disposed above support plate 890. Actuating mechanism 850 mechanically communicates and drives nut 820 through bevel gear 855. Placing actuating mechanism 850 above support plate 890 reduces the density of components disposed below support plate 890, which can allow for a system having a higher density of removable apparatus 801 (e.g., battery modules). In addition, the actuating mechanism 850 is protected by support plate 890 from inadvertent contact (e.g., by robots), which could damage actuating mechanism 850.

Similar to previous figures, FIG. 8 illustrates a tapered bolt guide 835 and a nut guide 880 including a flared portion, which are both used to align nut 820 and bolt 830. FIGS. 9-12 illustrate the alignment and positioning of bolt guide 835, nut guide 880, bolt 830, and nut 820, similar to the description above with respect to FIGS. 3-7.

Figure 13:
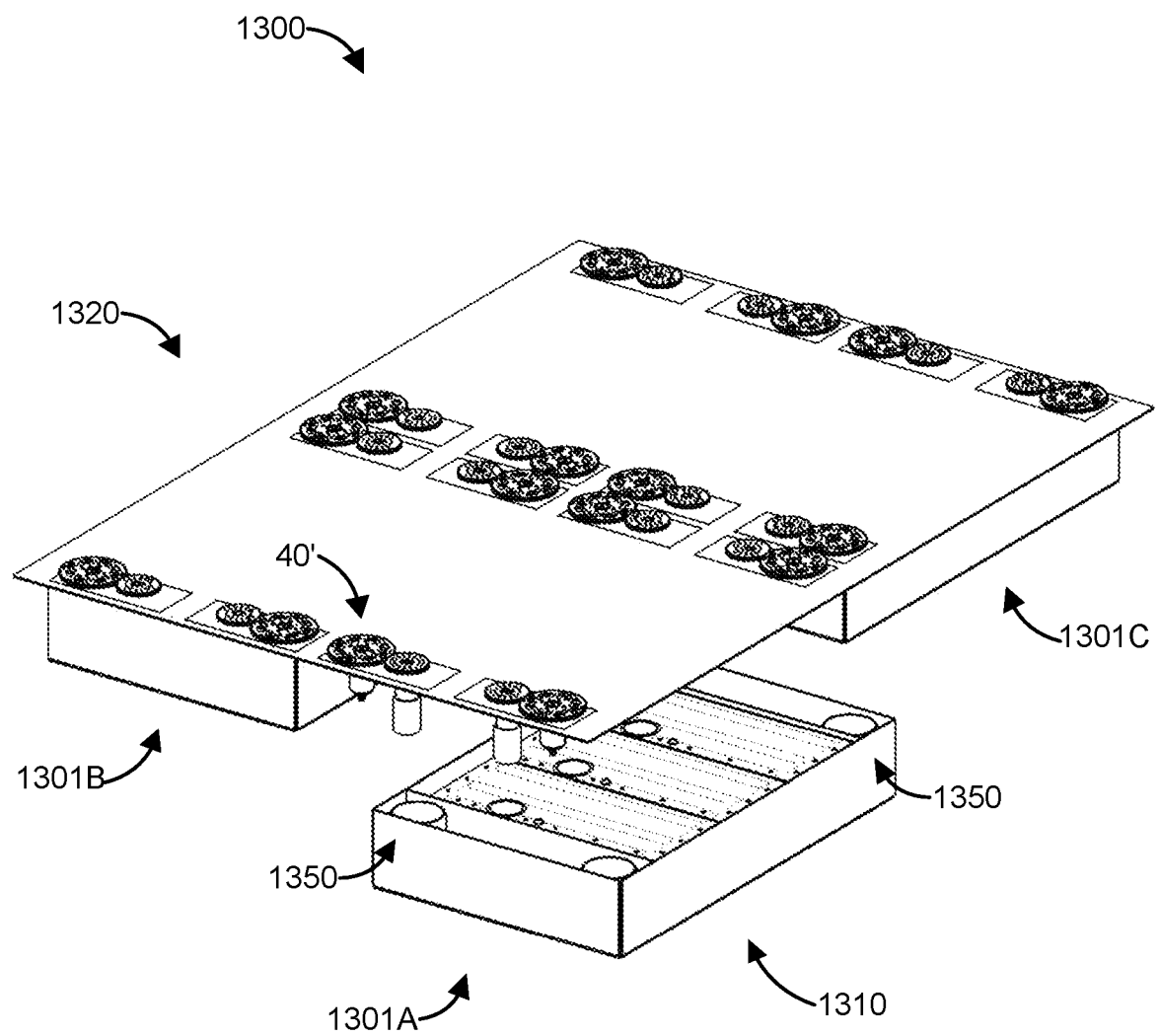
FIG. 13 illustrates a perspective view of an automated system including a robotic system and a removable apparatus in a disconnected state.

FIG. 13 illustrates a perspective view of an automated system 1300 including robotic system 1320 and removable apparatus 1301A in a disconnected state. The automated system 1300 includes a robotic system 1320 that includes a plurality of actuators 1340 that are each connected to respective bolts and bolt guides (and/or nuts and nut guides, depending on the embodiment), as described above. The removable apparatus 1301A comprises a tray 1310 that includes a plurality of tapered guides 1350 and respective channels for holding nuts and springs (and/or bolts and springs, depending on the embodiment), as described above. The tray 1310 can include a plurality of modular components (e.g., rechargeable batteries) or a single component. A plurality of removable apparatus 1301B, 1301C in a secured state is illustrated adjacent the disconnected removable apparatus 1301A for reference.

Figure 14:
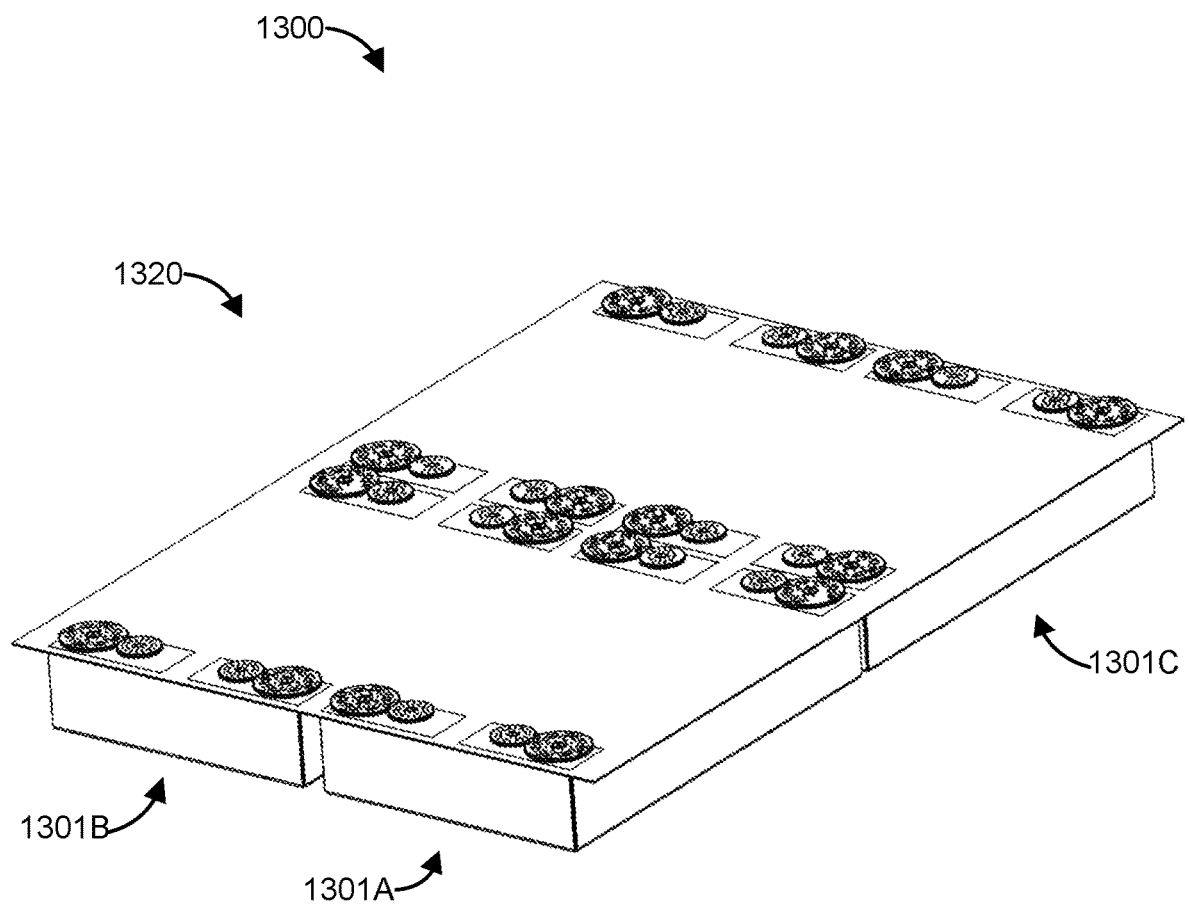
FIG. 14 illustrates a perspective view of the automated system of FIG. 13 where each removable apparatus is in a secured state.

FIG. 14 illustrates a perspective view of the automated system 1300 of FIG. 13 where each removable apparatus 1301A-1301C is in a secured state.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein. The present materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and sub-combinations of the various features described hereinabove as well as variations and modifications thereof, which would occur to persons skilled in the art upon reading the foregoing description.

What is claimed is:

1. A method comprising:
with a robot, raising a portable apparatus towards a stationary apparatus, the portable apparatus including an alignment guide that includes an alignment guide body having opposing first and second faces, the alignment guide body having a cavity extending from the first face to the second face, the cavity defined by an internal tapered wall that tapers from a second width at the second face to a first width at the first face, the second width greater than the first width;
inserting the stationary apparatus into the cavity on the second face of the portable apparatus;
aligning a first threaded fastener at least partially disposed in a first housing of the stationary apparatus with a corresponding second threaded fastener at least partially disposed in a second housing of the portable apparatus, the alignment guide disposed on the second housing, the corresponding second threaded fastener aligned with the cavity in the alignment guide; and
rotating the first threaded fastener to engage and secure the first threaded fastener with the corresponding second threaded fastener.

2. The method of claim 1, further comprising stopping the rotating when a threshold torque level applied to the first threaded fastener is reached.

3. The method of claim 1, further comprising electrically connecting a modular rechargeable battery unit comprised of the portable apparatus with a battery receptacle comprised of the stationary apparatus.

4. The method of claim 3, further comprising electrically connecting the battery receptacle with a vehicle.

5. The method of claim 1, further comprising sliding the first housing along the internal tapered wall to align the first threaded fastener with the corresponding second threaded fastener.

6. The method of claim 1, further comprising attaching the stationary apparatus to a support plate.

7. The method of claim 6, further comprising mechanically coupling a motor to the first threaded fastener, the motor secured to the support plate.

8. The method of claim 7, further comprising rotating the first threaded fastener with the motor.

9. The method of claim 1, further comprising before raising the portable apparatus towards the stationary apparatus, placing the portable apparatus so that the second threaded fastener is at least partially aligned with the first threaded fastener.

10. The method of claim 1, wherein a spring is disposed between the corresponding second threaded fastener and the second housing of the portable apparatus, and the method further comprising applying a force, with the spring, to press the corresponding second threaded fastener against the first threaded fastener when the first threaded fastener engages with the corresponding second threaded fastener.

* * * * *